(12) United States Patent
Zellweger

(10) Patent No.: US 6,356,910 B1
(45) Date of Patent: Mar. 12, 2002

(54) METHOD AND APPARATUS FOR A SELF-SERVICE CONTENT MENU

(75) Inventor: Paul Zellweger, 82 Fresh Pond La., Cambridge, MA (US) 02138

(73) Assignee: Paul Zellweger, Cambridge, MA (US)

( * ) Notice: Subject to any disclaimer, the term of this patent is extended or adjusted under 35 U.S.C. 154(b) by 0 days.

(21) Appl. No.: 09/358,153

(22) Filed: Jul. 20, 1999

Related U.S. Application Data

(60) Provisional application No. 60/095,808, filed on Aug. 7, 1998.

(51) Int. Cl.⁷ .................................................. G06F 17/00
(52) U.S. Cl. .................. 707/100; 707/10; 707/501; 707/513; 709/218; 345/753
(58) Field of Search ....................... 707/10, 7; 709/223; 345/753, 754

(56) References Cited

U.S. PATENT DOCUMENTS

| 5,299,135 | A | * | 3/1994 | Lieto et al. .................. 364/479 |
| 5,809,527 | A | * | 9/1998 | Cooper et al. ............... 711/133 |
| 5,870,559 | A | * | 2/1999 | Leshem et al. ........ 395/200.54 |
| 5,958,008 | A | * | 9/1999 | Pogrebisky et al. ......... 709/223 |
| 6,020,889 | A | * | 2/2000 | Tarbox et al. ............... 345/356 |
| 6,144,962 | A | * | 11/2000 | Weinberg et al. ............. 707/10 |

* cited by examiner

*Primary Examiner*—Hosain T. Alam
*Assistant Examiner*—Tam V Nguyen

(57) ABSTRACT

A content management system on a Web-site that serves as a end-user access method is disclosed. The prior art of the open hierarchical data structure is used to organize content and provide the basis for a content menu. This present invention improves upon this prior art by teaching how to make a self-service input that accommodates individual information providers throughout the enterprise.

20 Claims, 15 Drawing Sheets

METHOD AND APPARATUS FOR A SELF-SERVICE CONTENT MENU

CROSS REFERENCE TO RELATED APPLICATION

This application is based on Provisional Application No. 60/095,808 entitled Method and Apparatus for a Self-Service Content Index on a Web Site Using an Open Hierarchical Data Structure, filed Aug. 7, 1998.

FIELD OF INVENTION

The present invention relates to computer software used to organize information on a Web site, and more specifically it relates to a content management system on a network that enables individual information providers to add topics and links to a central location that provides end-user access to content on the network.

REFERENCES
U.S. Patent DOCUMENTS
U.S. Pat. No. 5,918,227 Jun. 29, 1999 Polnerow et. al.
U.S. Pat. No. 5,893,107 Apr. 6, 1999 Chan et. el.
U.S. Pat. No. 5,630,125 May 13, 1997 Zellweger
U.S. Pat. No. 5,146,403 Sep. 8, 1992 Goodman
U.S. Ser. No. 09/080,100 May 16, 1998 Zellweger
U.S. Ser. No. 09/080,102 May 16, 1998 Zellweger
U.S. Pat. No. 6,144,962 November, 2000 Weinberg et al.
U.S. Pat. No. 6,020,889 February, 2000 Tarbox et al.
U.S. Pat. No. 5,958,008 September, 1999 Pogrebisky et al.
U.S. Pat. No. 5,870,559 February, 1999 Lesham et al.
U.S. Pat. No. 5,809,527 September, 1998 Cooper et al.
U.S. Pat. No. 5,299,135 March, 1994 Lieto et al.

OTHER REFERENCES

*The Chicago Manual of Style.* Chicago, Ill.: The University of Chicago Press, 1982.

Zellweger, Paul. "Web-based Sales: Defining the Cognitive Buyer." *International Journal of Electronic Markets.* Vol. 7 No. 3, 1997. pp. 16–22.

Zellweger, Paul. *The Knowledge Tree.* unpublished paper, copyright ArborWay, Inc. Jan. 3, 1998.

BACKGROUND

"To the outside world, a home page on a Web-site represents the primary way to access information on a site. Yet, the standard access methods, such as directory services and hypertext link structures, are very ineffective in representing detailed information that can be found on specific pages within the site. To overcome this problem, home pages often refer end-users to search engines, but this retrieval technology only compounds the issue by providing a "black box" approach that hides details for people who are unfamiliar with what to expect.

The sheer volume of information on most Web sites is one problem. Another problem is that this content comes from a number of different contributors who often maintain it from remote locations. Setting standards on naming conventions and coordinating the links to each provider's contribution is difficult. Administrators responsible for such web sites need not only a comprehensive way to provide access to detailed information, but they also need a uniform and systematic way for different information providers to supply links to their content."

FIGURES

To correct flaws in the uniformity, thickness, and line quality of the figure drawings, FIGS. 1 through 12c on 15 separate sheets are resubmitted with this amendment. In addition, all numbers and reference characters in FIGS. 12a through 12c have been redrawn to adhere to the minimum height requirement of ⅛ of an inch.

A content menu provides an excellent way to provide end-user access to highly detailed information. Zellweger discloses methods for creating the content menu using an open hierarchical data structure (U.S. Pat No. 5,630,125) that enables multiple paths to reach the same object. To optimize this system for a network traffic Zellweger (U.S. Ser. No. 09/080,100) discloses how to use this structure to create and manage a network of HTML links on a Web-site. Zellweger (U.S. Ser. No. 09/080,102) also discloses how to generate a Java-based content menu that can be applied to a Web-site. But neither of these disclosures teaches how to make this technology control the way content providers add links to the underlying menu structure.

Polnerow et. al. (U.S. Pat No. 5,918,227 Jun. 29, 1999) disclose an on-line directory service which uses search routines to locate relevant content in a database. The disclosure does not reveal how content was added to the database. On the other hand, Chan et. al. (U.S. Pat. No. 5,893,107 Apr. 6, 1999) discloses a method for making directory services uniform by employing an object class that defines properties that end-users can browse. However, Chan et. al. does not organize these properties in a structure like the open hierarchical data structure nor does it prompt providers to link such properties in a structure that organizes the information. And lastly, Goodman (U.S. Pat No. 5,146,403 Sep. 8, 1992) discloses a self service method for end-users to change their address in a public area such as a post office or shopping center, however, the disclosure does not link it to a structure that organizes its information.

This present invention discloses how to employ an open hierarchical structure to organize content on a Web-site and provide a centralized end-user access to information. More importantly, the present invention discloses how to build and maintain a content menu that enables individual information providers to add topics and links to content they maintain.

Establishing a self-service content menu in a network, like the Internet, has far reaching implications. The lack of effective directory services makes access to detailed information difficult. The content menu overcomes this limitation by providing a scalable retrieval technology that can handle detailed content on a Web-site, an Intranet site, and, most importantly, on a portal site that aggregates sources of detailed information on the network. By enabling individual content providers to contribute to the growth of a content menu, the present invention overcomes one of its own limitations, its expensive labor-intensive construction.

OBJECTIVES AND ADVANTAGES

It is a general object of the present invention to provide the means for creating and maintaining a central end-user access method that links to electronic documents stored in a network like the World Wide Web.

One object of the present invention is to provide a method and apparatus for building and maintaining a content menu that links to electronic objects throughout a network.

Another object of the present invention is to provide a method to that enables a Web administrator to program input menus that control how individual information providers to supply detailed information about content that they maintain on their servers.

One object of the present invention is to provide a method for enabling individual information providers to access a central end-user access method and add links to their content

SUMMARY OF THE INVENTION

The objects of the invention are attained by providing the methods and apparatus for building and maintaining a content menu, derived from an open hierarchical data structure, that manages links to electronic objects in a network. An administrator employs the present invention to establish a central access method for end-users that enables end-users to browse content details and access these objects. Administrators use the present invention to create a self-service method that enables individual content providers to link their content to a central source.

DETAILED DESCRIPTION OF THE FIGURES

Figure 1:
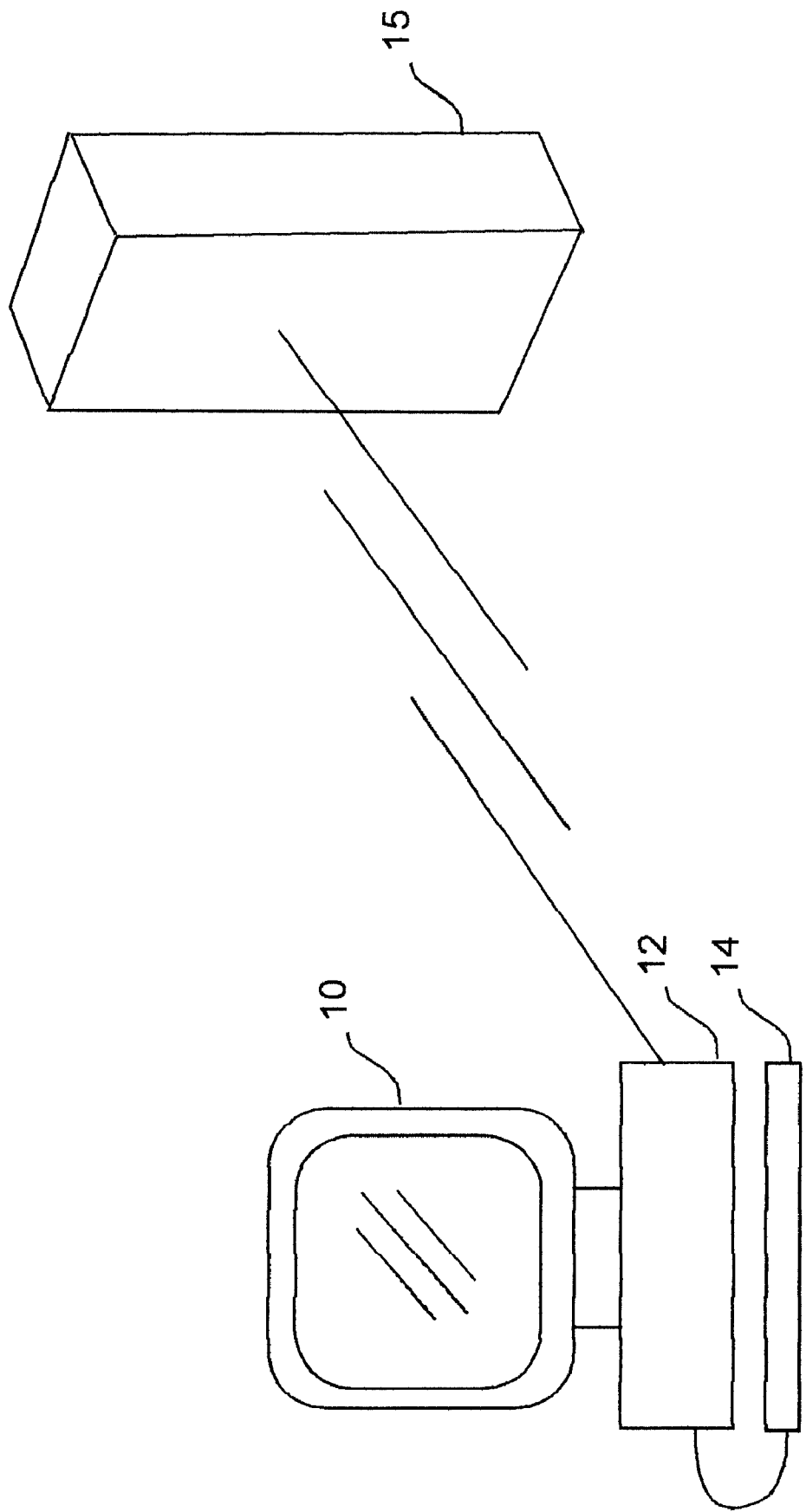
FIG. 1 depicts the graphic representation of the client-server apparatus of the present invention.

FIG. 1 depicts the client server apparatus of the present invention. The server computer 15 contains the operating system, relational database management system, and communications software. A client computer 12 is linked electronically to server computer 15 and has its own operating system, browser software, and communication software that enables it to request files stored on server computer 15 and display them on monitor 10.

Figure 2:
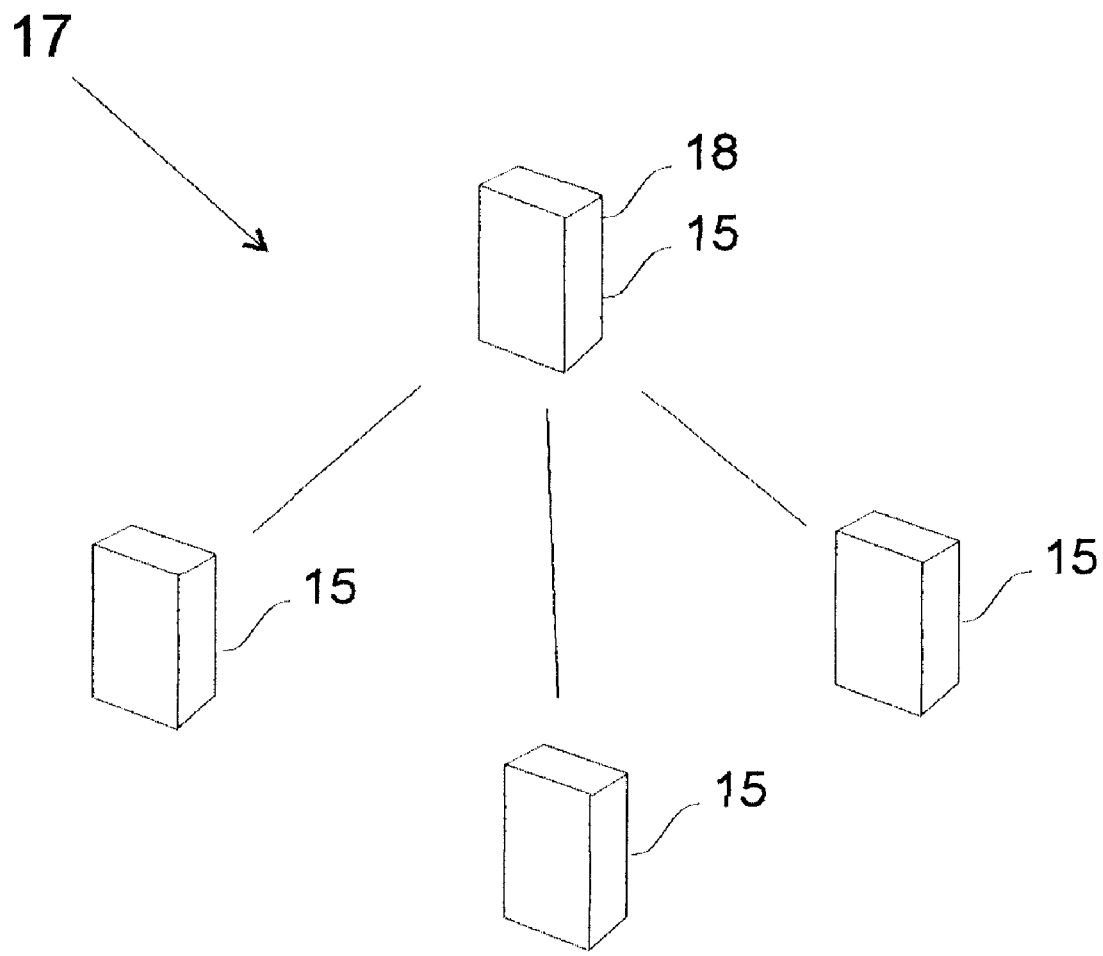
FIG. 2 depicts a graphic representation of an enterprise-wide network that contains more than one server computer.

In the present invention a Web site can represent a single server computer 15 as well as more than one server computer 15 in an enterprise network as depicted in FIG. 2.

In the enterprise-wide network a single computer 18 serves as a central point that links to other servers like 15 in the organization. Server 18 typically includes a home page for the enterprise and end-user services that access content on computers located throughout the enterprise. Individual information providers in 17 store and maintain content on one or more server computers 15.

Yet, applications of the present invention are not limited to Intranet or enterprise-wide sites. The present invention can also be deployed on Web sites that serve as aggregators of information known as portals. In this context, the present invention collects topics and links from individual providers that get added to the underlying menu structure. The links point to their content on independent servers in the network.

Figure 3:
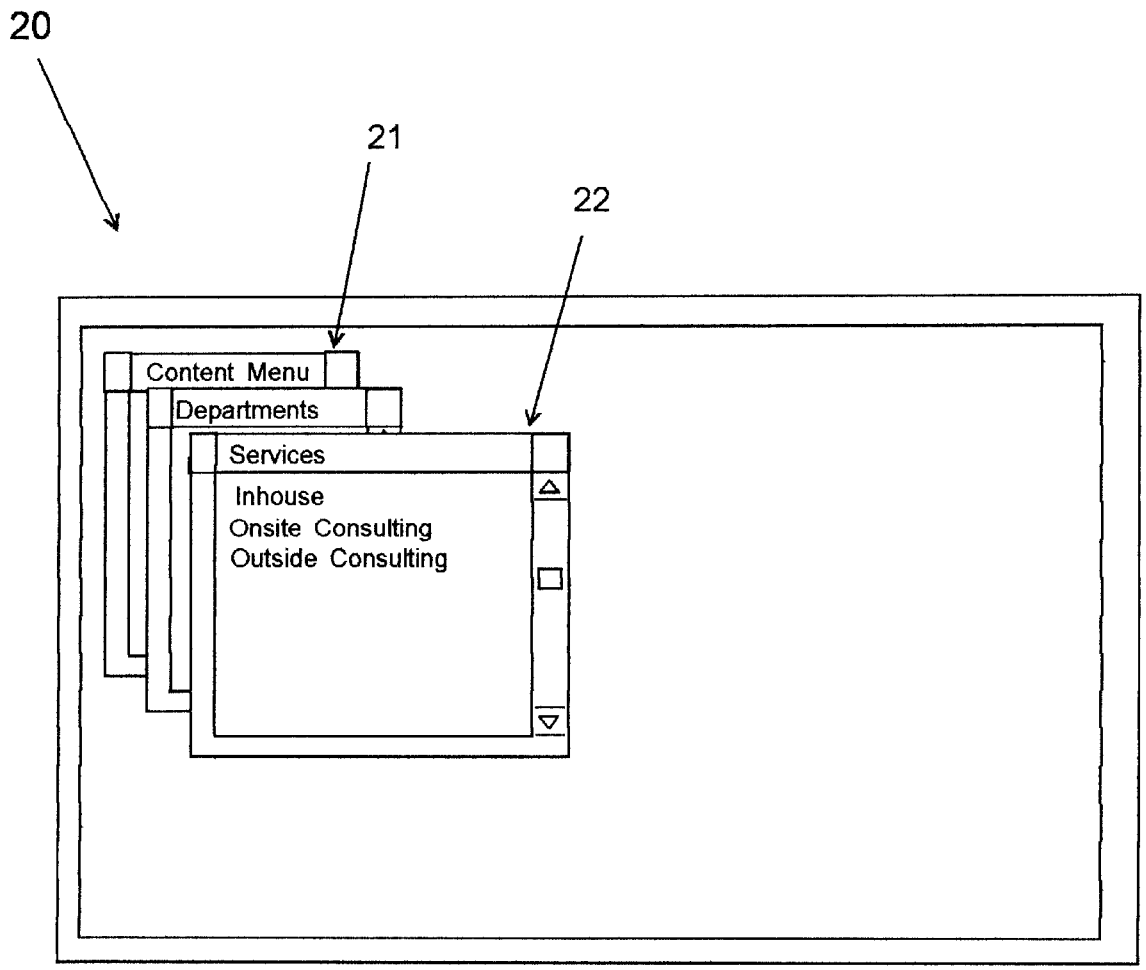
FIG. 3 depicts a graphical representation of the prior art of the content menu

The prior art of the content menu is depicted in FIG. 3. Window 20 on a computer monitor displays content menu 21. Menu 21 is derived from an underlying knowledgebase the open hierarchical data structure that organizes information for end-user access. Each list menu 22 in content menu 21 includes one or more entries, a title, and a scrolling device if needed. Each time an end-user selects an entry in a list menu 22 the content menu system 21 displays an information object or another list menu 22 that refines the level of detail on the prior selection.

Figure 4:
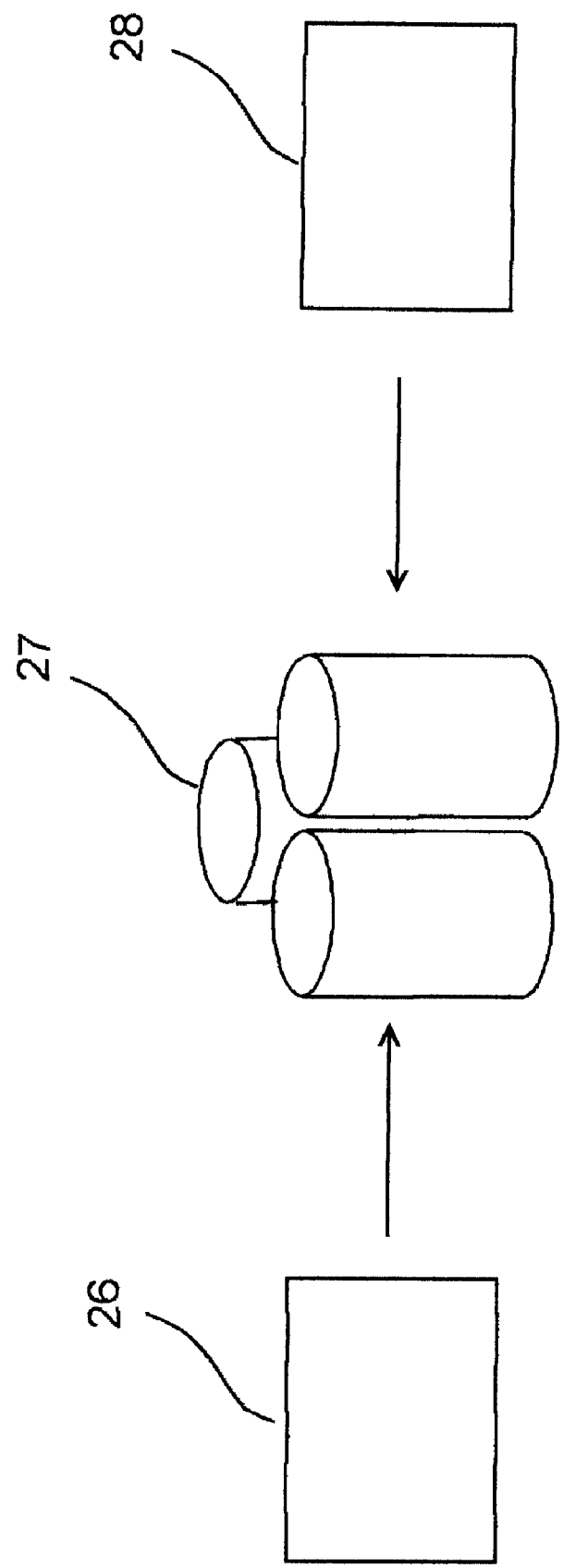
FIG. 4 depicts the major software components of the prior art of the content menu authoring system.

The primary software components of the prior content menu 21 are depicted in FIG. 4. An authoring system 26 generates one or more menu files 27 that represent one or more list menus like 22. Browser software 28 accesses menu files 27 to display the content menu 21. Improvements brought about by the present invention and new capabilities to Authoring system 26 that enable web site administrators program input menus associated with 26 that allow individual content providers to add links to their content via self service menus.

Figure 5:
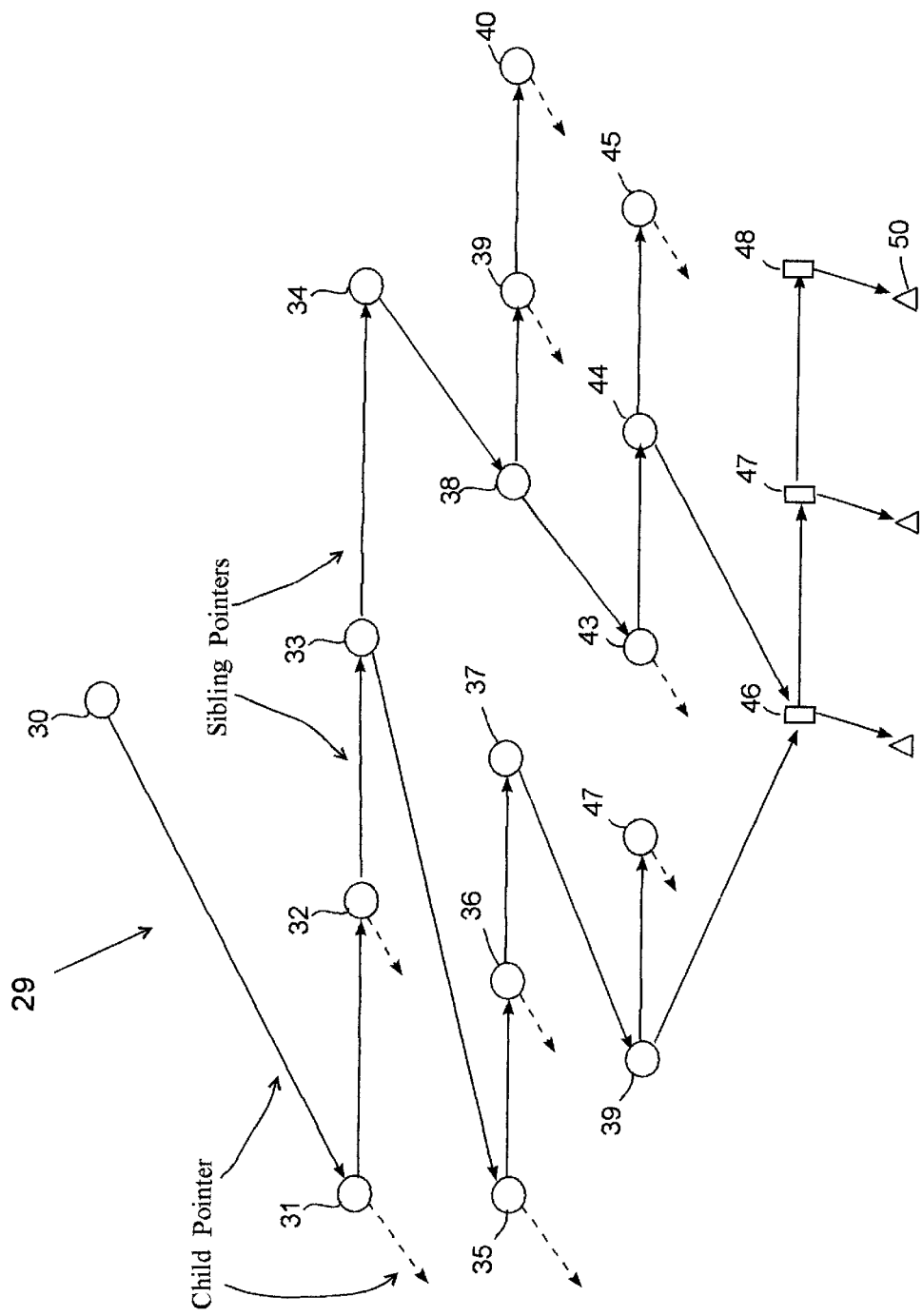
FIG. 5 depicts a graphic representation of the prior art of the open hierarchical data structure.

The underlying data structure responsible for content menu 21, an open hierarchical data structure 29, is depicted in FIG. 5. Authoring system 26 includes the tools and utilities to build and maintain structure 29 and the improvements brought about by the present invention for content providers to add links to their content.

Elements in structure 29 include nodes and arcs. Flow starts at a single root node 30 and progresses through one or more branching nodes like 33 or 34 till an information object like 50 is reached. Generational terms are used to describe these elements and how they relate to another. For instance, a successor node would be considered a child or offspring and its predecessor would be considered a parent. Each non root node has an outgoing child and sibling arc. Child arcs represent the next object in the flow, a list or an information object, and sibling arcs create lists that correspond to a menu list.

The distinctive feature of structure 29 is that there is no limit on the number incoming child arcs on any node below the root. This means that any node below the root can have more than one parent, a primary and one or more step-parents. Multiple incoming arcs in structure 29 enable it to represent a wide range of organizational schemes, using a list of lists that intersect and overlap. For instance, structure 29 can represent a taxonomy of terms. It can also represent a more complex conceptual network such as a list of terms that link to their properties that in turn, point to a list of values that link to different units of information.

Figure 6:
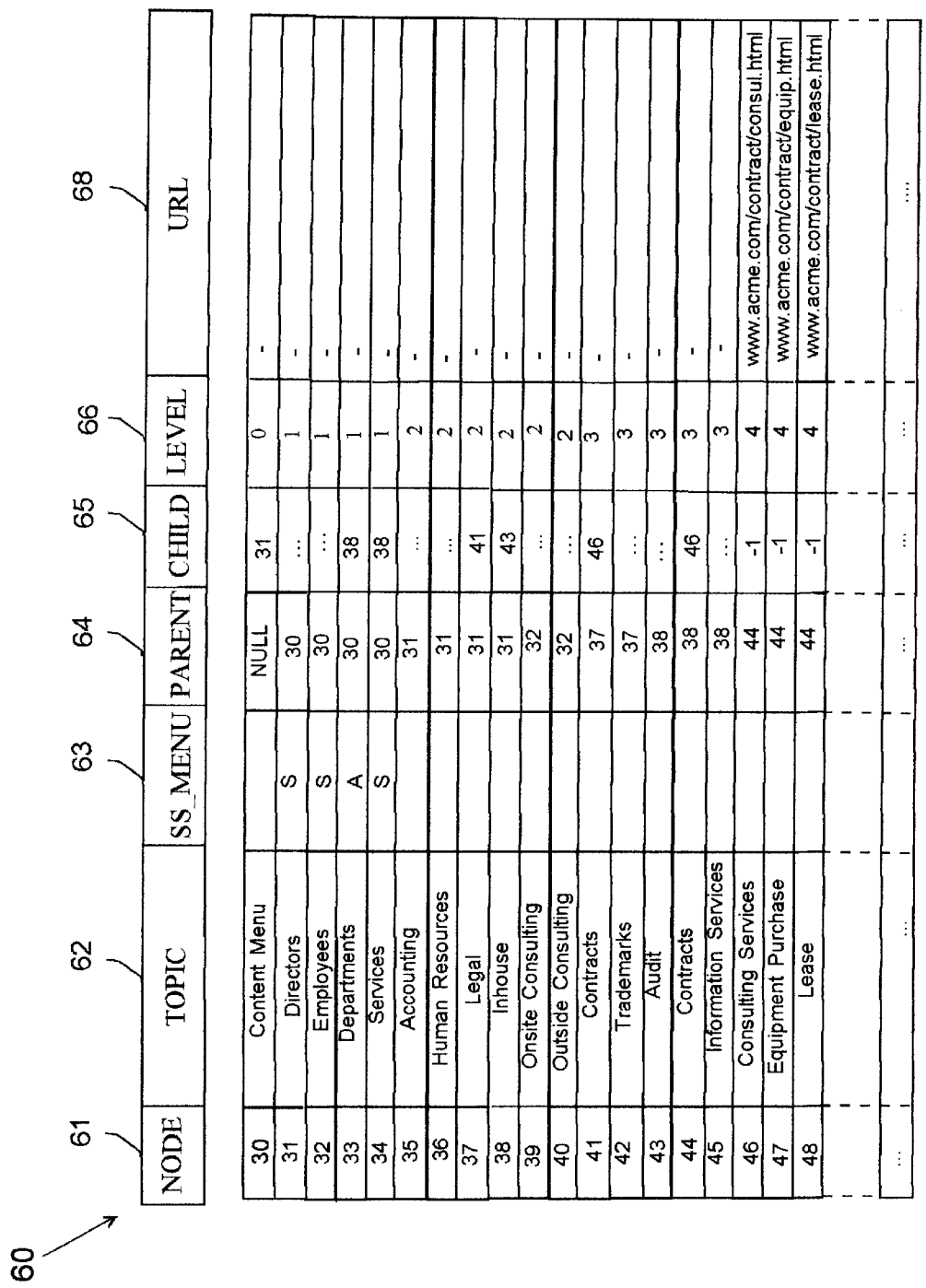
FIG. 6 depicts the prior database structure used to represent nodes in the open hierarchical data structure.

In the preferred embodiment of the present invention database structure 60, depicted in FIG. 6, represents nodes in 29. A developer uses commands in authoring system 26 to build and manage nodes and links in 29. Each node in 29 is represented by an entry in 60. This includes an information key, TOPIC 62, that corresponds to an entry in a list menu 22. It also includes PARENT 64 and CHILD 65 links to nodes in 60 and URL 68 that links a data node to an information object on Web page. Multiple CHILD 65 values can link to the same NODE 61 while PARENT 64 only contains primary parent values. And lastly, a node in 60 can have a SS_MENU 63 code that designates it as a parent node in a self-service input menu.

Figure 7A:
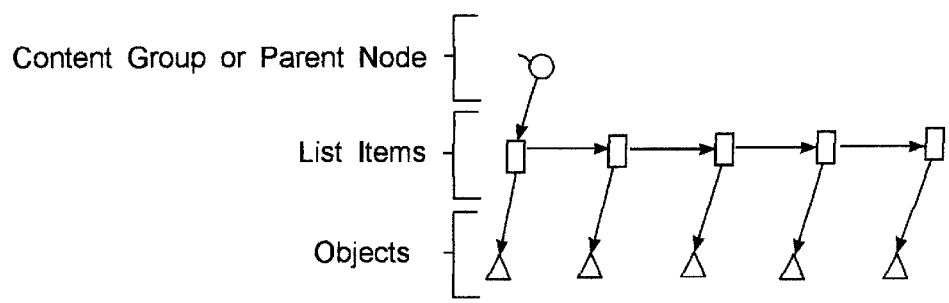
FIGS. 7a through 7c depict a graphic representation of three relationship templates represented by the open hierarchical data structure.
Figure 7B:
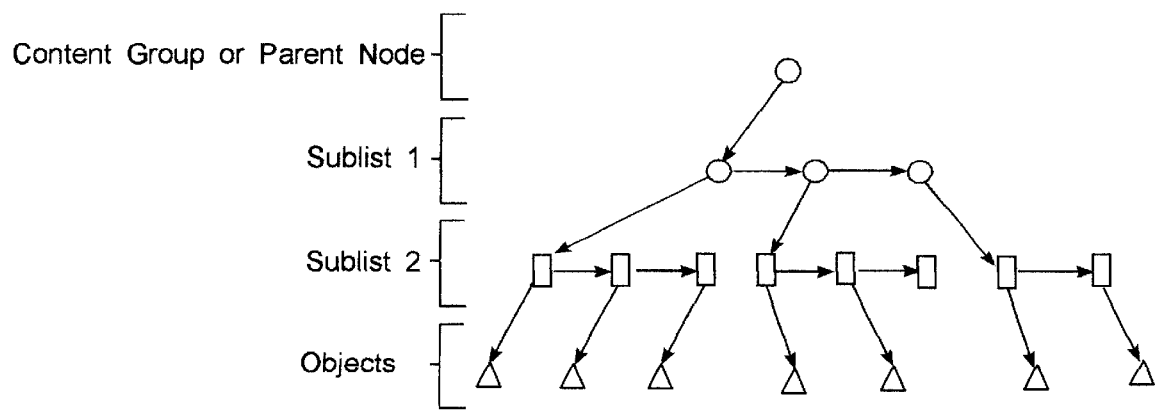
Figure 7C:
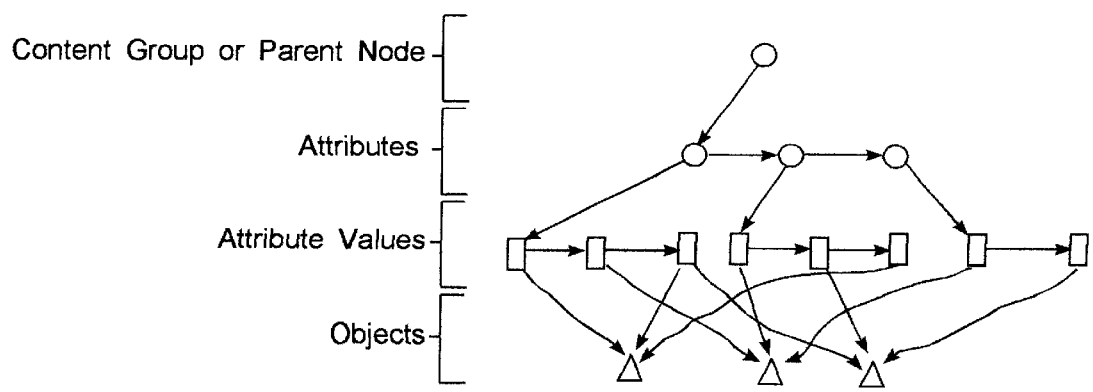

FIGS. 7a through 7c represent a graphical representation of different organizational relationships that can be represented by structure 29. FIG. 7a represents a simple list organization where a parent node points to a list of one or more data nodes where each list item links to an information object.

FIG. 7b represents a nested sublist organization where a parent node links to two or more nested sublists that, in turn, link to information objects. Each sublist refines a topic located in an prior list. In practice, the structure represents conceptual organizations like a taxonomy of terms.

And finally FIG. 7c, represents attribute/value lists. In this relationship, a parent node refers to the name of a category or group that links to a set of attributes or properties which, in turn, link to a set of values that link to information objects at the bottom of the network. The attribute/value lists represent one of the most powerful capabilities of the open hierarchical data structure because it shows end-users on a detailed basis how similar information objects differ from one another.

FIGS. 8a through 8d depict the menu interfaces used by a Web administrators to configure a self-service input menu for individual contributors responsible for maintaining local content.

Figure 8A:
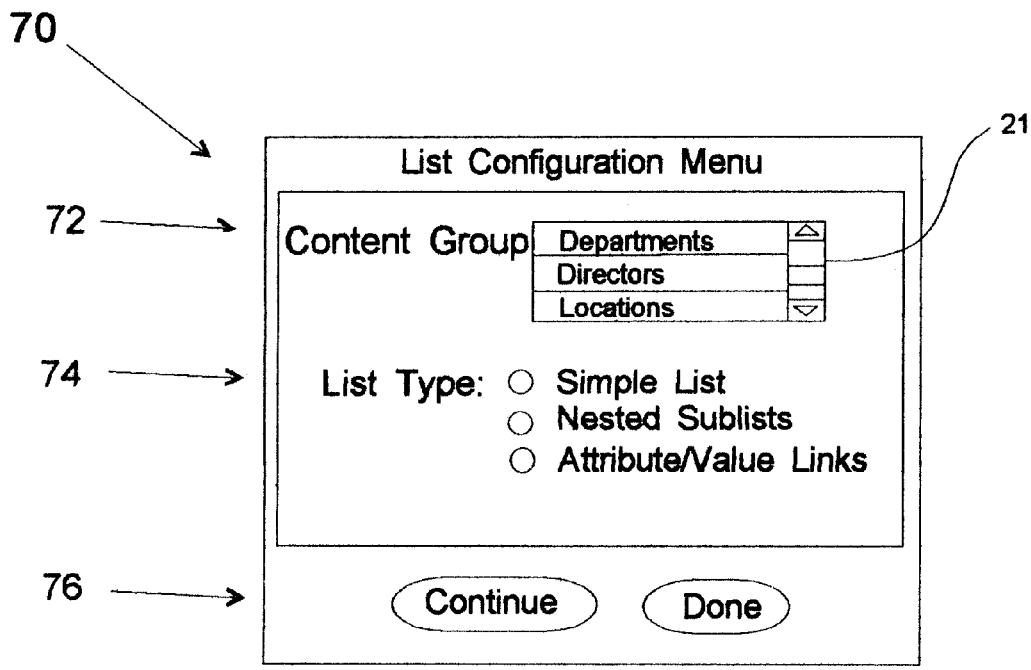
FIGS. 8a through 8d represent the menu interface used by menu developers to configure the self service menus used by information providers.

FIG. 8a depicts the first menu a Web administrator encounters when he or she creates a self-service input menu. The administrator navigates through a content menu 21 in 70 that displays topics managed by structure 29 in authoring system 26 to select a content group or parent node that represents where input gets appended to structure 29. Next, at 74 the administrator selects an organizational type for the proposed input menu. The choices: simple list, nested sublists, and attribute/value lists, correspond to the organizational schemes represented in FIGS. 7a through 7c. At 76, the administrator selects the Continue button to complete the input menu configuration or the Done button to close menu 70 and return control to the previous menu.

Figure 8B:
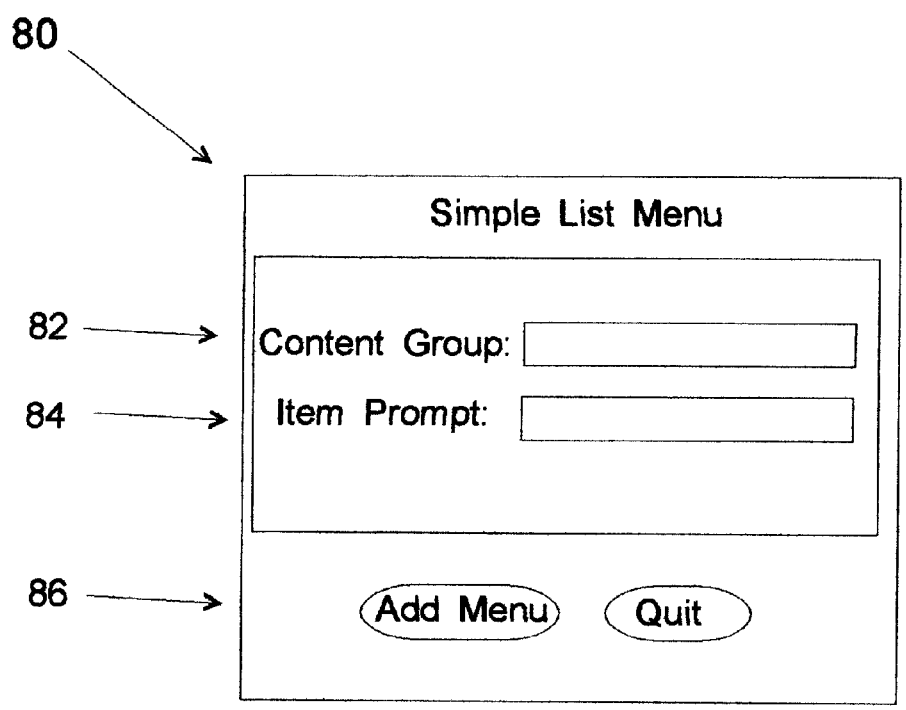

The Simple List Menu 80, depicted in FIG. 8b, is display when the administrator selects a Simple List type in window 70. Content Group 82 displays the topic selected in content menu 21 in window 70 that serves as a parent node. The administrator supplies a menu prompt for each item in the simple list at 84. To generate menu data for the self-service simple list input menu the administrator selects Add Menu at 86. Otherwise, the Quit button closes window 80.

Figure 8C:
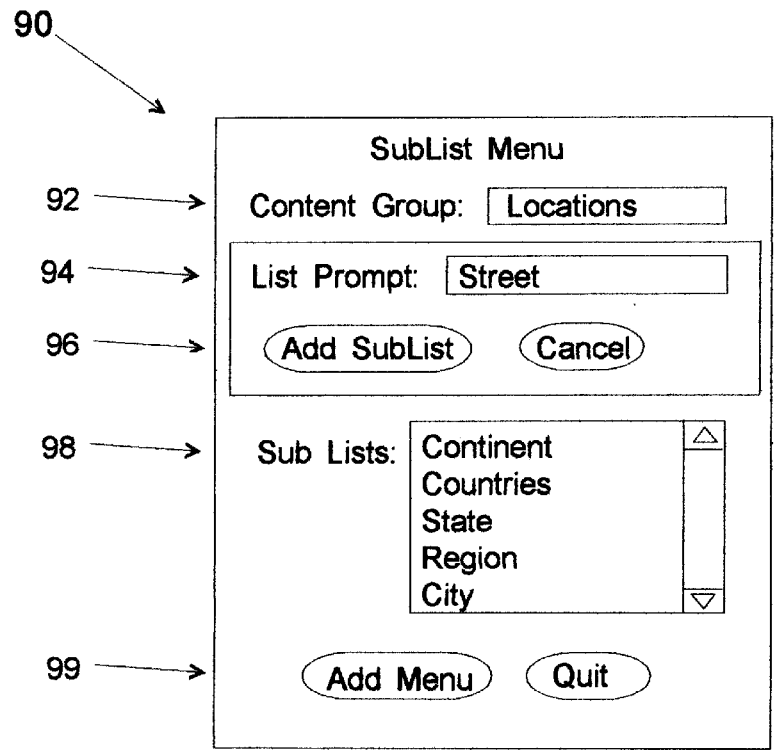

The SubList Menu 90, depicted in FIG. 8c, is display when the administered selects a Nested SubLists type in window 70. Content Group 92 displays the topic selected in content menu 21 in window 70 that serves as a parent node. The administrator supplies a menu prompt for each sublist at 94. Each time he or she selects the Add SubList button at 96 the prompt at 94 is added to the scrolling list of prompts in 98, and 94 gets cleared. To generate menu data for the self-service sublist input menu the administrator selects Add Menu at 99. Otherwise, the Quit button closes window 90.

Figure 8D:
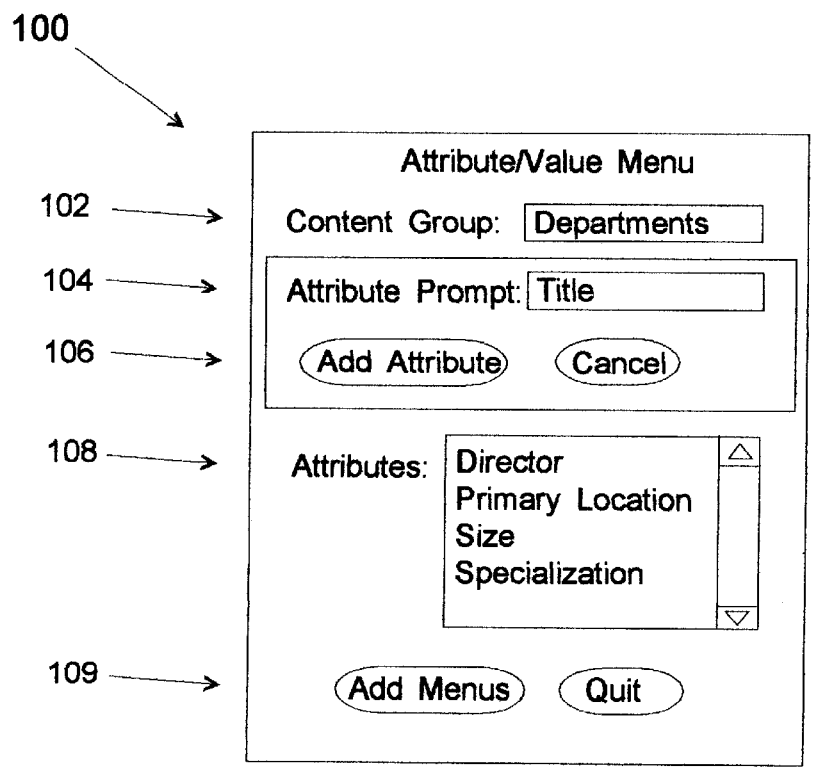

The Attribute/Value Menu 100, depicted in FIG. 8d, is displayed when the administered selects Attribute/Value Lists in 74 in window 70. Content Group 102 displays the topic selected in content menu 21 in window 70 that serves as a parent node. The administrator supplies a menu prompt for each attribute at 104. Each time he or she selects the Add Attribute button at 106 the attribute name at 104 is added to the scrolling list of attribute prompts in 108, and 104 gets cleared. To generate menu data for the self-service attribute/value input menu the administrator selects Add Menu at 109. Otherwise, the Quit button closes window 100.

FIGS. 9a through 9d depict the self service input menus produced by the present invention. Individual information providers throughout the enterprise use these self-service input menus to link their content to a content menu located on a home page of a Web site.

Figure 9A:
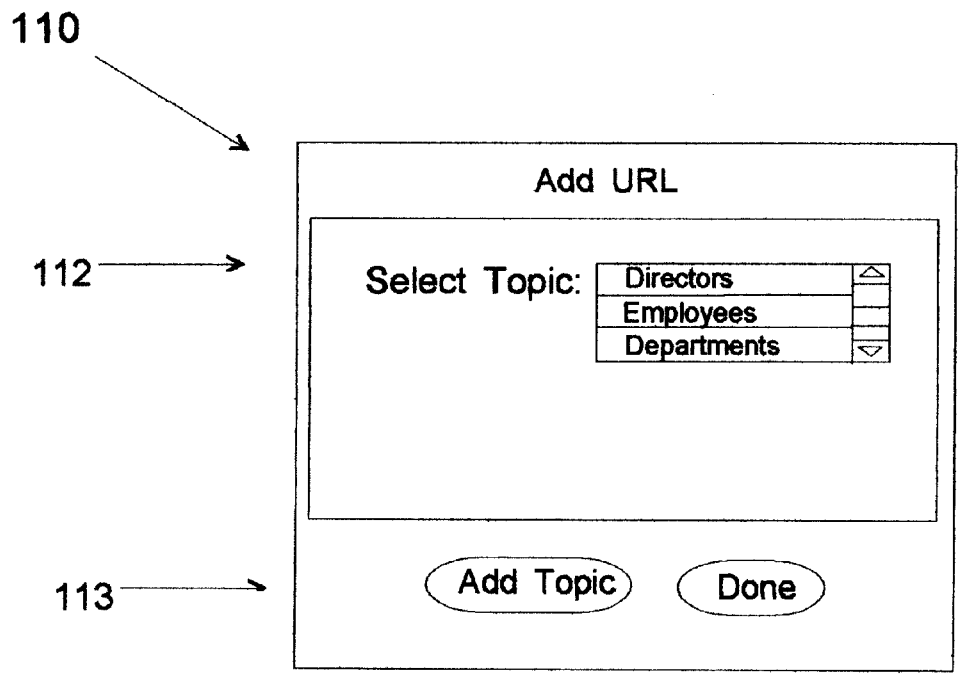
FIGS. 9a through 9d represents the self-service menu interface produced by the present invention that is used by individual information providers.

Menu 110, depicted in FIG. 9a, is the first menu an information provider sees when they use the self-service linking capability of the present invention. Scrolling window 112 displays all the content groups that prompt providers for descriptive topics before prompting for a URL. When a topic is selected and the Add Topic button in 113 is selected, the authoring system 26 generates an input menu from the selection depicted in FIGS. 9b through 9d.

Figure 9B:
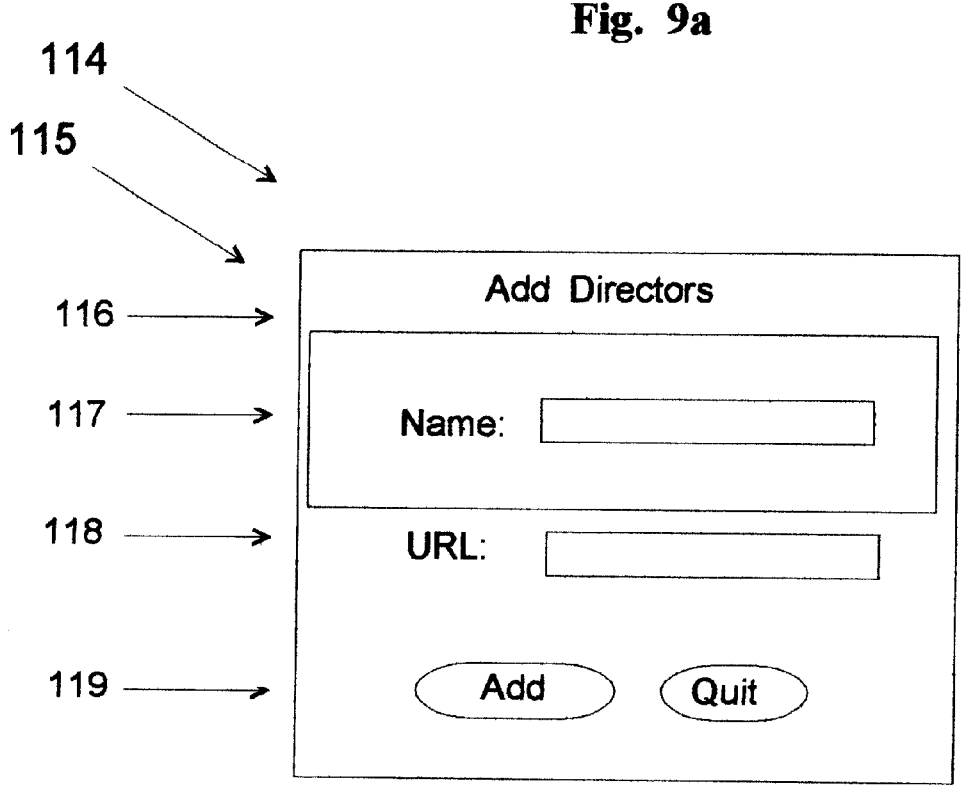

The Add Director menu 114, depicted in FIG. 9b, is a self service input menu 115 that corresponds to a simple list type where a parent topic links to a single list that, in turn, links to information objects. The menu title 116 corresponds to the topic selected by the provider at 112 in menu 110. The label 117, Name, directly corresponds to the item prompt 84 in configuration menu 80 supplied by the administrator. The end-user provider fills URL 118 with the universal resource locator associated with the information object. When the provider selects the Add button in 119 authoring system 26 adds an entry to a sibling list in structure 29.

Figure 9C:
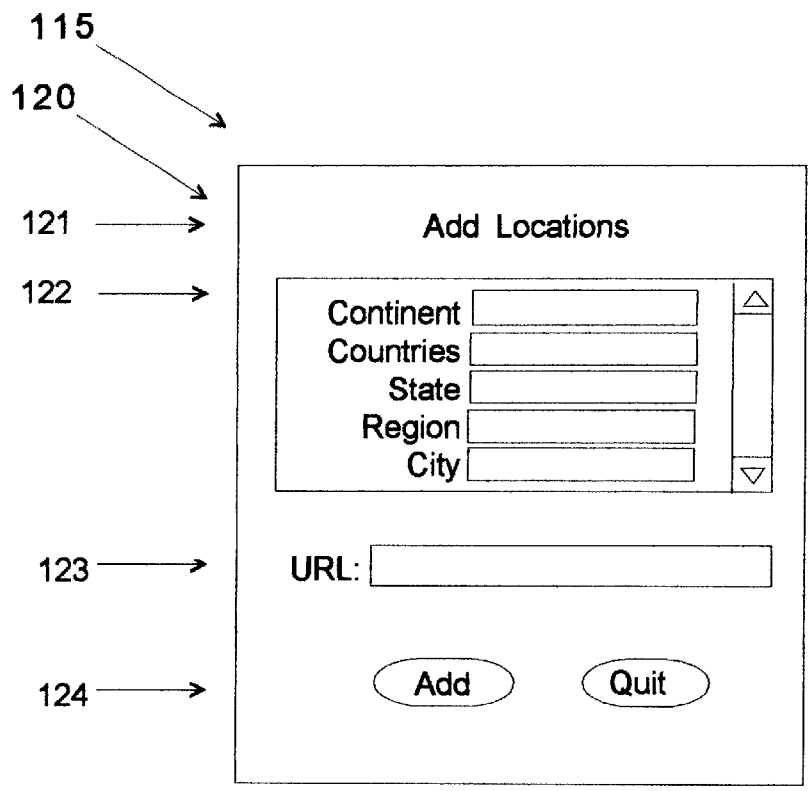

The Add Locations menu 120, depicted in FIG. 9c, is a self service input menu 115 that corresponds to a nested sublist type where a parent topic links to two or more nested list menus that, in turn, link to information objects. The menu title 121 corresponds to the topic selected by the provider at 112 in menu 110. The text prompt in 122 correspond to the list of sublists 98 provided by the administration in menu 90. The end-user provider fills URL 123 with the universal resource locator associated with the information object. When the provider selects the Add button in 124 authoring system 26 add these entries to each level in a series of nested sibling lists in structure 29

Figure 9D:
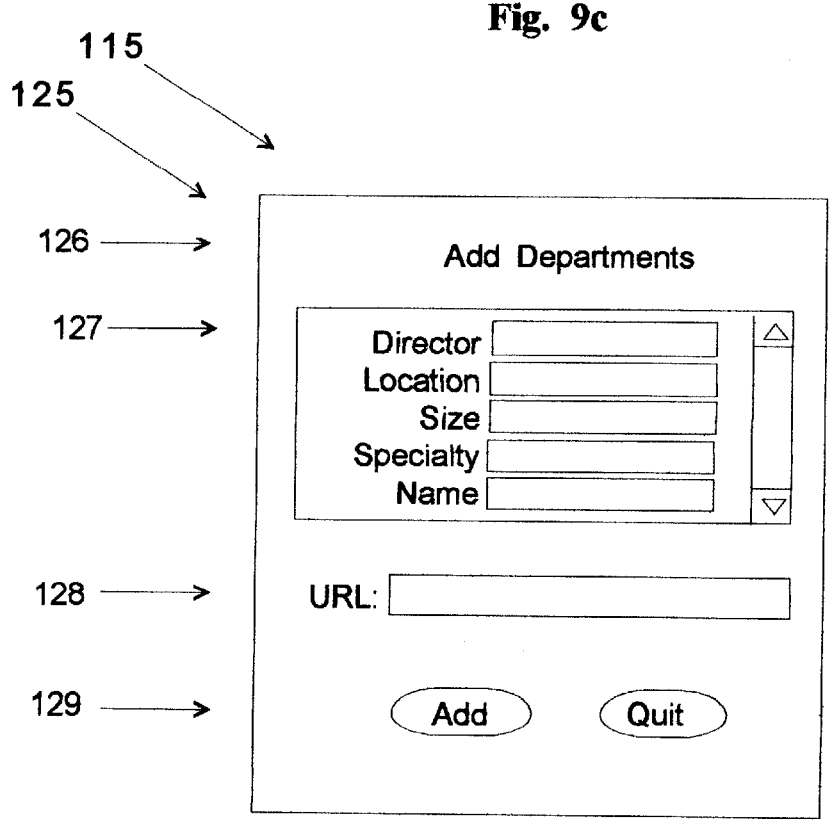

The Add Departments menu 125, depicted in FIG. 9d, is a self service input menu 115 that corresponds to an attribute/value list type where a parent topic links to a list of attribute names that link to a value list that, in turn, links to a set of information objects. The menu title 126 corresponds to the topic selected by the provider at 112 in menu 110. The text prompt in 127 corresponds to the list of attributes 108 supplied by the administration in menu 100. The end-user provider fills URL 128 with the universal resource locator associated with the information object. When the provider selects the Add button in 129 authoring system 26 links these entries to structure 29 in a way that corresponds to a network of lists that point to an object.

Figure 10:
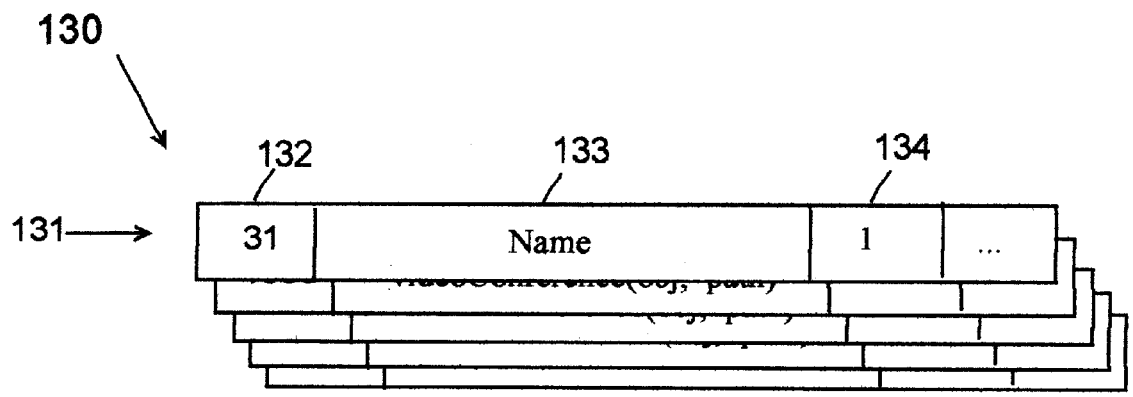
FIG. 10 depicts a graphic representation of a database structure of menu prompts used to generate the self-service input menus.

Database structure 130, depicted in FIG. 10, stores menu data for a self service input menu 115. Each element 131 of database 130 contains information that enables the present invention to generate the self service input menu 115 at runtime. This includes 132 that links to a database element in structure 29, 133 that contains a prompt field label, and 134 that contains a sequence number for the prompt field. Authoring system 26 adds an element 131 to 130 and the links between 600 and 130 in SS_MENU 63 when the administrator selects an Add Menu button in 90, 100, or 110.

Figure 11:
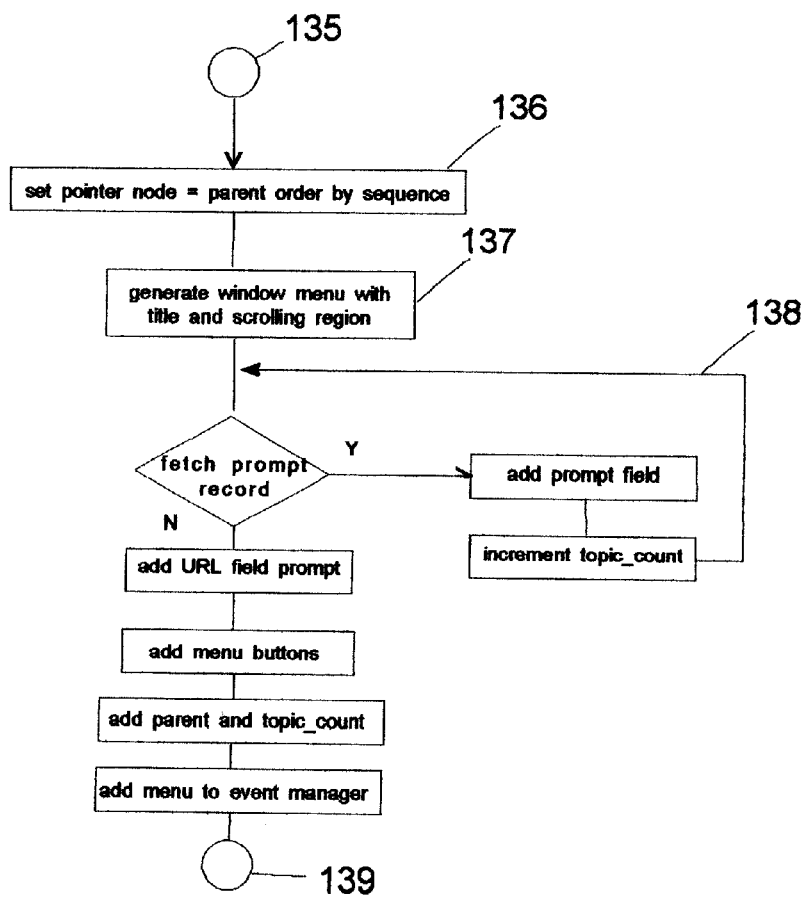
FIG. 11 depicts the flow chart of the program logic used to build the self service input menu.

FIG. 11 depicts an embodiment of the flow chart that generates the source code for a self service menu 115 deployed in a client-server network. The source code, disclosed in this specification, represents a programming language that when compiled produces an event driven program that executes on a client computer 12 and produces a self service menu 115. Alternative embodiments of the present invention use other client-server programming language technologies, like hypertext, to generate a self service menu 115, collect end-user input, and update structure 26. Other alternative embodiments build and compile a self-service menu 115 prior to executing it.

On entry the routine 135 receives a node 61 value that is the parent of the destination list. At 136, a pointer is set to all database elements 131 where 132 matches the parent value, the list is sorted by 134. Next, the routine generates source code that creates the frame for the self service input menu 115, the menu title, and a prompt region that, if needed, supports a scrolling device. Loop 138 fetches each database element 131 and adds source code for the prompt label and input text field to the prompt region. It also keeps track of the topic_count. When all prompt elements 131 have been processed, routine 135 next adds source code for the URL label and input field, menu command buttons, and values associated the parent node and topic_count. And lastly, routine 135 generates source code that adds menu 115 to the window manager and control reverts to the event manager.

Figure 12A:
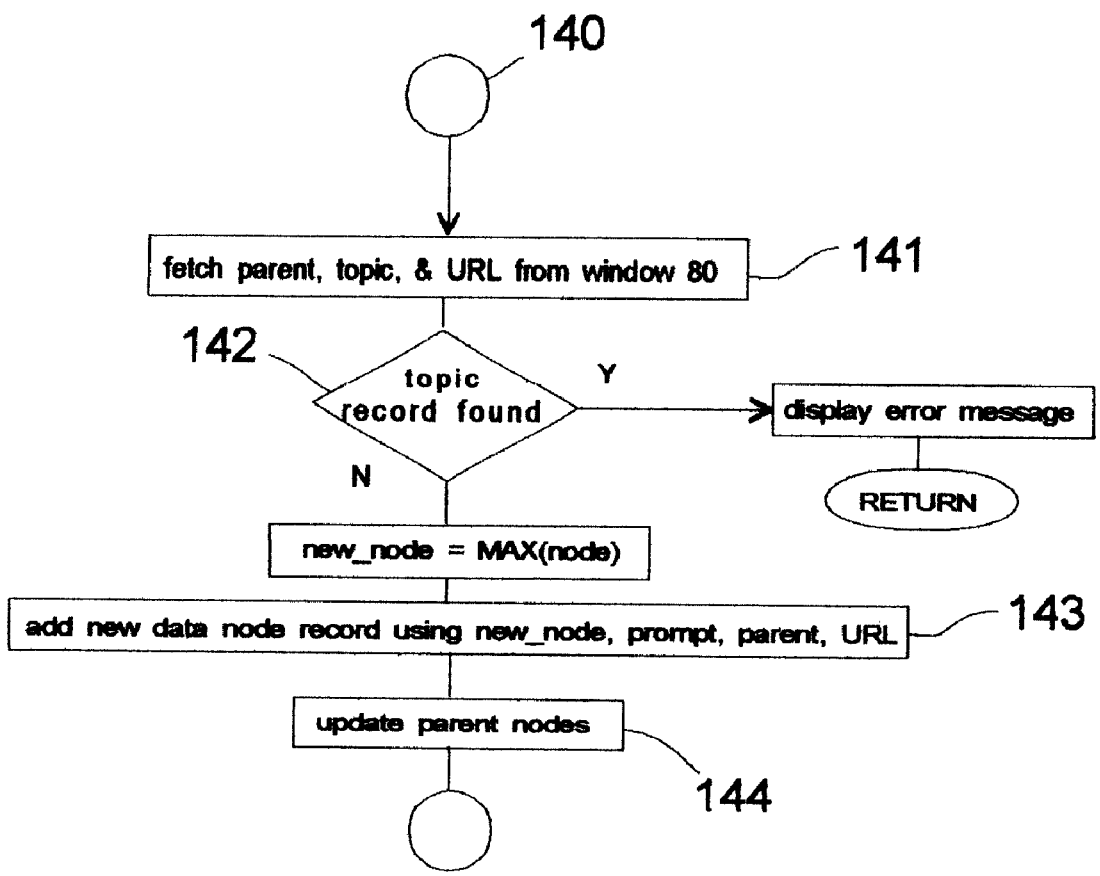
FIGS. 12a through 12c depict the flow chart of the program logic of the self service input menus that add new topics entries to the open hierarchical data structure.
Figure 12B:
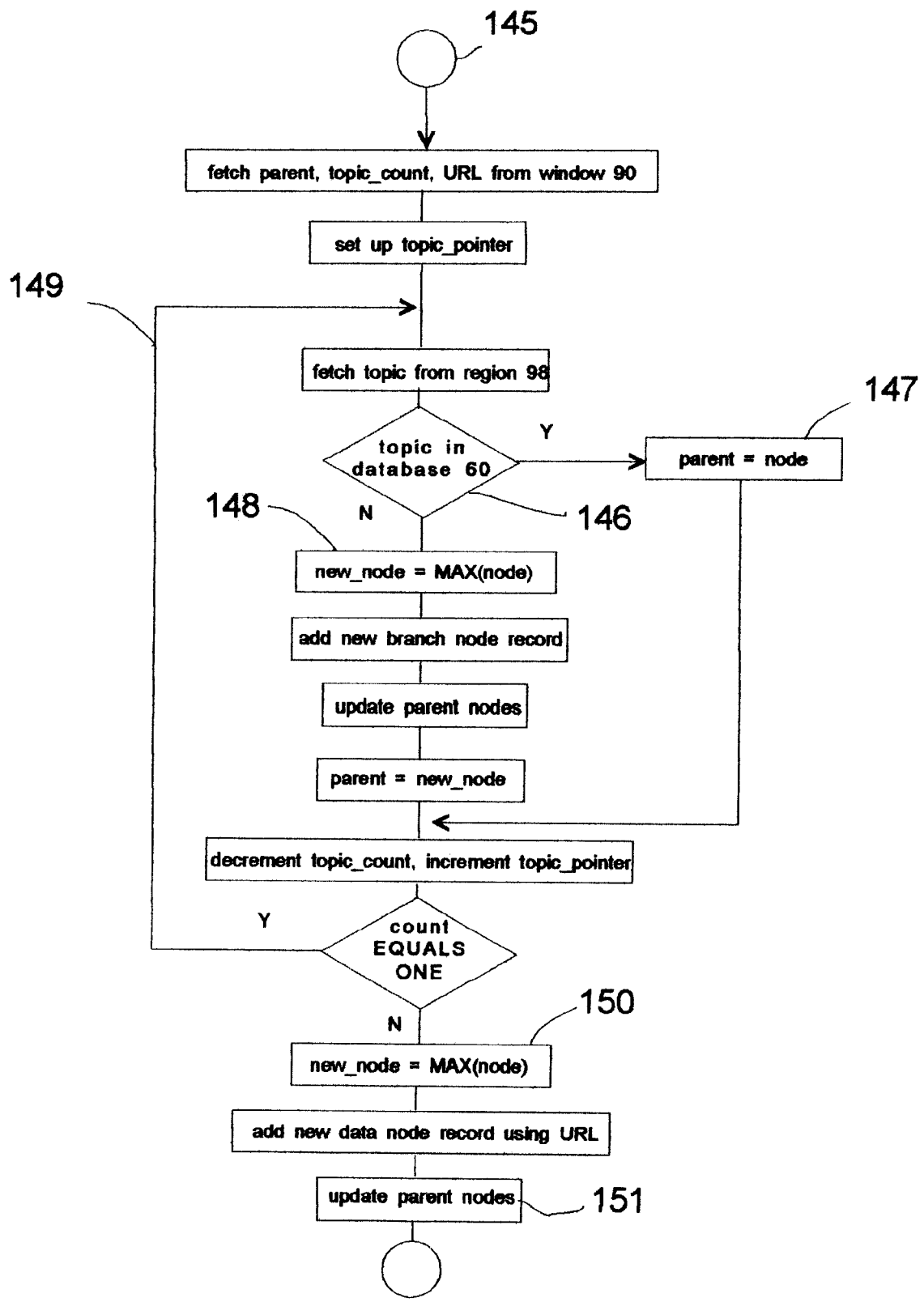
Figure 12C:
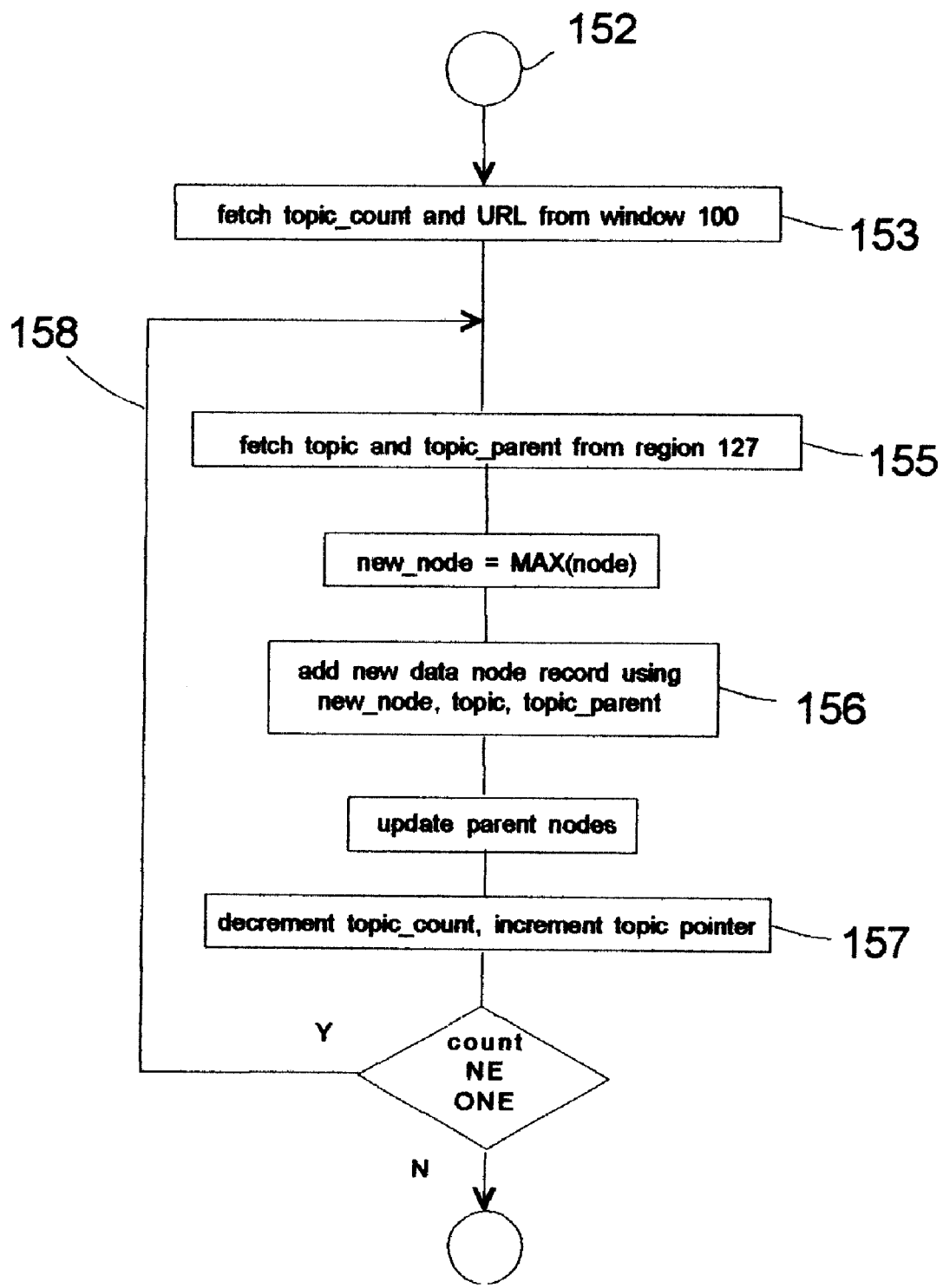

FIGS. 12a through 12c depict an embodiment of the flow chart that fetches data from self service input menu 115 and adds one or more nodes to structure 29. In the embodiment of the present invention these program routines are implemented in a client-server programming language that executes on client 12. The code fetches input values from menu 115 and submits commands to update database 60 on server 18. Alternative embodiments of the present invention use other client-server programming language technologies, like hypertext forms and CGI scripts on a server computer 18, to implement self service menu 115, collect end-user selections and input, and update database structure 60 according to the type of self service menu 115 and the end-user's input.

Routine 140, depicted in FIG. 12a, is executed when Add Menu button is selected by the information provider from the Simple List type self service menu 115 like 114. At 141 routine 140 fetches the content group or parent node associated with 115, the topic from 117, and URL from 118. At 142, the routine searches database 60 for the parent node and topic. If it is found then routine 140 issues an error message to the user and returns control to menu 80, otherwise it adds a new data node to structure 29, updates all node links including those of multiple parents, and returns control to the event manager.

Routine 145, depicted in FIG. 12b, is executed when Add Menu button is selected by the information provider from the SubList type self service menu 115 like 120. First, routine 145 fetches the content group or parent node, topic_count, and URL from 120. Next, it initializes a pointer to topic entries in region 98.

In loop 149 routine 145 fetches a topic and its parent node from 98. At 146, the routine searches database 60 for the topic and parent node combination. If it is not found in 60 routine 145 loop 149 adds a new branch node to structure 29 and updates all node links including multiple parents links. Otherwise, it updates parent with the current node and drops control to the bottom of loop 149. Here, the pointer to 98 is incremented and count is checked. When count is equal to 1, signifying the last item in a set of sublists, control drops from 149 and the last node in the final list and its UR1 is added to 60 and their respective node links are updated including multiple parent links.

Routine 152, depicted in FIG. 12c, is executed when Add Menu button is selected by the information provider from the Attribute/Value type self service menu 115 like menu 125. First, it fetches topic_count and URL from 128. Next, control flows to loop 158 where input topic values are fetched from region 127. For each topic loop 158 adds a data node at 158 and then updates the parent links. At 157 topic_count is decremented and topic_pointer is incremented. When topic_count is less than one control drops out of loop 158 and returns to the event manager.

Conclusion

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

Having described an embodiment of the invention we claim:

1. A component of a menu authoring system based on an open hierarchical data structure consisting of, displaying a configuration user interface employed by a network technician to create a self service input menu for a content provider, fetching a set of configuration selections made by said network technician, transforming said set of configuration selections made by said network technician into a set of menu data, generating said self-service input menu based on said set of menu data, displaying said self-service input menu to enable said content provider to specify a set of menu input, fetching a set of menu input made by said content provider on said self-service input menu, linking a node to said open hierarchical data structure based on said set of menu input made by said content provider, displaying a list menu in a content menu that links to an information object based on said set of menu input made by said content provider.

2. The component in said authoring system of claim 1 wherein the component is implemented in a computer program language that is compatible with at least one computer operating system.

3. The component in said authoring system of claim 1 wherein said configuration user interface further includes displaying a control selection for creating a simple list in said open hierarchical data structure.

4. The component in said authoring system of claim 1 wherein said configuration user interface further includes displaying a control selection for creating a set of sublists in said open hierarchical data structure.

5. The component in said authoring system of claim 1 wherein said configuration user interface further includes displaying a control selection for creating a network of attribute/pair lists in said hierarchical data structure.

6. The component in said authoring system of claim 1 wherein linking said node to said open hierarchical data structure firther includes linking said node to more than one parent node in said open hierarchical data structure.

7. The component in said authoring system of claim 1 wherein linking said node to said open hierarchical data structure further includes generating a menu path in said open hierarchical structure that includes said node in said simple list.

8. The component in said authoring system of claim 1 wherein linking said node to said open hierarchical data structure further includes generating a menu path in said open hierarchical structure that includes said node in said set of sublists.

9. The component in said authoring system of claim 1 wherein linking said node to said open hierarchical data structure further includes generating a menu path in said open hierarchical structure that includes said node in said network of attribute/value lists.

10. The component in said authoring system of claim 1 wherein linking said node to said open hierarchical data structure further includes generating a menu path in said open hierarchical data that does not duplicated a topic node under the same parent node in said open hierarchical data structure.

11. A component of a menu authoring system based on an open hierarchical data structure consisting of,
    the means for displaying a configuration user interface employed by a network technician to create a self service input menu for a content provider,
    the means for fetching a set of configuration selections made by said network technician,
    the means for transforming said set of configuration selections made by said network technician into a set of menu data,
    the means for generating said self-service input menu based on said set of menu data,
    the means for displaying said self-service input menu to enable said content provider to specify a set of menu input,
    the means for fetching a set of menu input made by said content provider on said self-service input menu,
    the means for linking a node to said open hierarchical data structure based on said set of menu input made by said content provider,
    the means for displaying a list menu in a content menu that links to an information object based on said set of menu input made by said content provider.

12. The component in said authoring system of claim 11 wherein the component is implemented in a computer program language that is compatible with at least one computer operating system.

13. The component in said authoring system of claim 11 wherein said configuration user interface further includes the means for displaying a control selection for creating a simple list in said open hierarchical data structure.

14. The component in said authoring system of claim 11 wherein said configuration user interface further includes the means for displaying a control selection for creating a set of sublists in said open hierarchical data structure.

15. The component in said authoring system of claim 11 wherein said configuration user interface further includes the means for displaying a control selection for creating a network of attribute/pair lists in said hierarchical data structure.

16. The component in said authoring system of claim 11 wherein linking said node to said open hierarchical data structure further includes the means for linking said node to more than one parent node in said open hierarchical data structure.

17. The component in said authoring system of claim 11 wherein linking said node to said open hierarchical data structure further includes the means for generating a menu path in said open hierarchical structure that incudes said node in said simple list.

18. The component in said authoring system of claim 11 wherein linking said node to said open hierarchical data structure further includes the means for generating a menu path in said open hierarchical structure that incudes said node in said set of sublists.

19. The component in said authoring system of claim 11 wherein linking said node to said open hierarchical data structure further includes the means for generating a menu path in said open hierarchical structure that includes said node in said network of attribute/value lists.

20. The component in said authoring system of claim 11 wherein linking said node to said open hierarchical data structure further includes the means for generating a menu path that does not duplicated a topic node under the same parent in said open hierarchical data structure.

* * * * *